Patented Oct. 2, 1928.

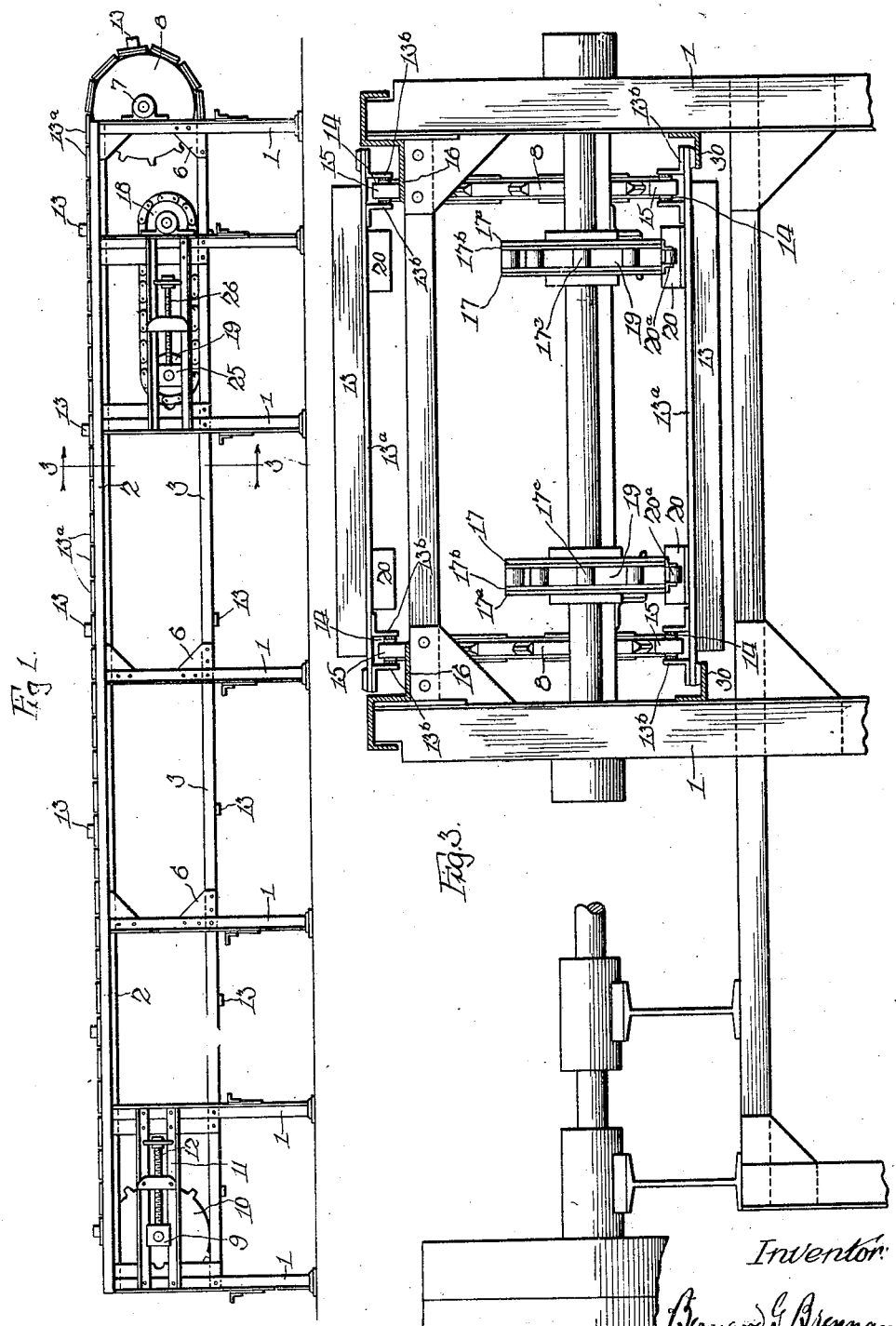

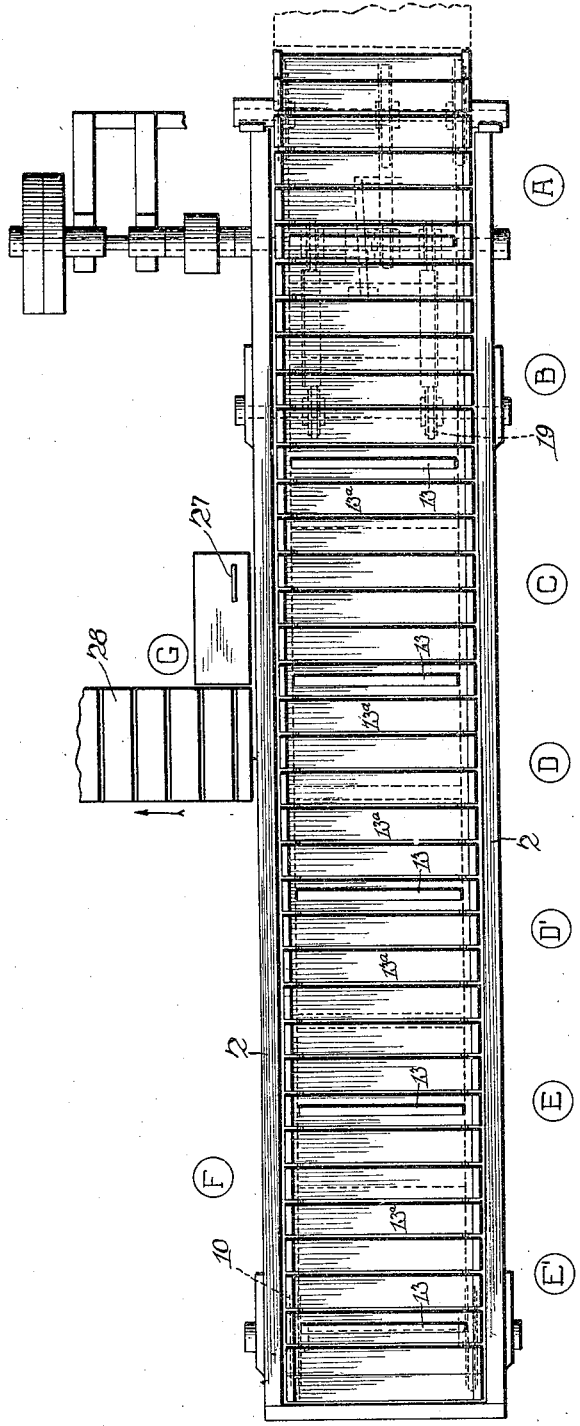

1,686,122

UNITED STATES PATENT OFFICE.

BERNARD G. BRENNAN, OF CHICAGO, ILLINOIS.

MEAT-CUTTING TABLE.

Application filed October 26, 1925. Serial No. 64,729.

In the meat packing industry conducted according to modern methods, it is customary to conduct carcasses of meat, or portions of such carcasses, by suitable conveyor means in a continuous, slow-travelling line, along and past workmen who perform various operations upon the carcasses, each workman at his particular station doing his particular task in the cleaning, trimming, cutting or removing some portion of the carcass, as the carcasses pass his station. It is the object of the present invention to provide an endless conveyor table to facilitate the cutting up of carcass sides, and according to my invention the cutting table is intermittently movable and so arranged as to shift the table quickly so as to bring the sides thereon from one work station to the next, the movements of the table being so timed as to enable the workmen to each perform his particular task during an interval of rest. To this end I have devised and invented the novel cutting table which is illustrated in the accompanying drawings and will hereinafter be described in detail, and my invention resides in the new organization and combination of parts and elements operating as described, and in incidental details in the construction and arrangement of parts which I have devised to accomplish the ends in view; the essential elements of my invention being more particularly pointed out in the appended claims, it being understood however, that the particular machine herein described is susceptible of variation and modification, as by the substitution of equivalent elements, and changes of form and proportions of parts, without departing from the substance of my invention or the scope of the claims.

In the accompanying drawings, Figure 1 is a longitudinal vertical section of my novel cutting table; Fig. 2 is a top plan view of the same, parts of the conveyor table being broken away to disclose parts underneath, and Fig. 3 is a transverse vertical section on the line 3—3 of Fig. 1.

Like reference characters designate like parts in all the figures of the drawing.

The frame work of the machine may be constructed of any suitable material, framed and secured together in such manner as to support the movable parts. In the present instance, as illustrated, it includes posts 1, connected by upper frame bars 2, lower frame bars 3, upper cross frame bars 4, and lower cross frame bars 5, all formed of angle iron and braced by angle plates 6, and supporting brackets arranged to support the bearings for the sprocket wheels carrying the conveyor table and the actuating sprocket chains hereinafter described.

At what will be termed the front end of the table, and mounted in bearing brackets 7 secured to the frame work, is mounted a pair of opposite idler sprocket wheels 8, and at the rear end of the table, journalled in bearing blocks 9, is a similar pair of idler sprocket wheels 10. To provide for adjustment of the rear sprocket wheels to take up wear and stretch of the links of the conveyor table hereinafter described, the bearing blocks 9 are slidingly mounted on a supporting bracket 11 which carries them, and are adjusted longitudinally of the machine by adjusting screws 12.

The conveyor cutting table, as illustrated, may be formed of wooden slats 13 secured to metal plates 13$^a$ which are equipped on their inner sides with angle plates 13$^b$ forming bearings for overlapping links 14 which are pivoted together through the angle plates to form an endless belt engaging the front and rear sprocket wheels. In the present instance each end of a slat member is provided with a pair of links, and midway upon the pivot connecting the overlapping pairs at each joint is arranged an anti-friction roller 15, the rollers being arranged to ride upon opposite angle iron track members 16 secured to the cross frame members, and at the loops of the belt engaging the teeth of the front and rear sprocket wheels. The vertical portions of the track 16 lies closely adjacent the end of the plates 13$^a$, and thus prevent sidewise movement of the table,—i. e., movement lengthwise of the slats,—to which the table would otherwise be subject because of the operations carried out upon it.

The conveyor table is given its intermittent movement by means of a pair of actuating sprocket chains 17 engaging a pair of front driving sprocket wheels 18 and a pair of rear idler sprocket wheels 19, the distance between the front and rear sprocket wheels 18 and 19 being approximately the same as the distance between the workmen's stations. Each of these actuating chains is made up of pivoted twin links 17$^a$ and 17$^b$, and an interposed roller 17$^c$ at each joint arranged to engage the sprocket wheels. To provide for taking up wear and stretch in the actuating chains, the rear sprocket wheels 19 are mounted in bearings 25 which are slidably supported in the machine frame and are adjustable longitudinally of the machine by means of adjusting screws 26. By suitable driving connections (not necessary to be here described) the sprocket wheels 18 are positively and continuously driven, the connections with such sprocket wheel being preferably made through a compression spring cushioning driving member to minimize the shock of starting the table. The lower reaches of the actuating sprocket chains 17 lie adjacent the path of the links 14 of the conveyor table, and at intervals corresponding approximately to the distance between workmen's stations certain of the slats of the conveyor table are provided with inwardly extending contact members in the form of pairs of angle plates 20 which project toward the links of the actuating chains 17. To a corresponding pair of the twin links of this actuating chain on each side of the machine are riveted a pair of right angled lugs, between the outwardly extending portions of which is pivotally mounted a roller $20^a$, the two rollers being arranged to engage in successive forward traverses of such rollers on the lower reach of the actuating chain, the successive pairs of angle plates 20 on the slats of the conveyor table thus driving the conveyor table rearwardly on its upper working reach in steps corresponding to the distance between the workmen. The lower faces of the slats of the conveyor table ride on opposite backing or supporting bars 30 below the actuating chains 17, whereby the angle plates 20 are prevented from disengagement with the rollers $20^a$. As the engagement between the angle plate 20 and rollers $20^a$ continues for a distance considerably less than one-half the length of the chain, the intervals of motion of the conveyor table are considerably shorter than its intervals of rest.

By way of illustration of a typical method of using the machine above described, sides of pork to be cut up may be successively delivered (after preceding operations for the removal of the head and shoulder) to the front end of the table opposite work station A, where a workman provided with a hand circular saw severs the bone at the butt of the ham. At station B a workman cuts off the ham, and throws it across to the further side of the table; at station C, a workman with a hand circular saw "scribes" the ribs; at stations D and D' the loins are removed by two workmen employing curved knives; at stations E and E' two workmen trim the loins, and at station F (on the other side of the table) the blades are removed. With this method and arrangement of workmen the hams cut from the side at station B may conveniently be handled by a workman at station G who saws off the end joints of the ham by means of a stationary circular saw 27 arranged at the further side of the table and places them upon a conveyor 28 to be delivered elsewhere for further treatment. It is obvious that the operations performed at the different work stations may differ according to the different kinds of meat being cut, and the methods employed in the particular plant.

I claim:

1. A machine for conveying meat sides and the like past work stations for performing particular operations thereon, said machine comprising front and rear rotatable idler members and an articulated endless conveyor table engaging said idler members, said conveyor table being equipped with contact members spaced apart the distance between work stations, and an actuating member arranged to successively engage said contact members and shift said table the distance between such members.

2. A machine for conveying meat sides and the like past work stations for performing particular operations thereon, said machine comprising front and rear rotatable idler members and an articulated endless conveyor table engaging said idler members, said conveyor table being equipped with contact members spaced apart the distance between work stations, front and rear sprocket wheels and an actuating sprocket chain arranged with one of its reaches adjacent the path of travel of said contact members, and an engaging member on said sprocket chain arranged to successively engage said contact members and shift said table the distance between such members.

3. A machine according to claim 2 in which said actuating sprocket chains are arranged between the upper and lower reaches of the conveyor table.

4. A machine according to claim 2 in which said actuating sprocket chains are arranged between the upper and lower reaches of the conveyor table, and in which the lower reaches of the chains in belt are in proximity and the engaging and contact members of the chains and table respectively are arranged to cooperate during their travel in such proximity.

5. A machine according to claim 2, in which said actuating sprocket chains are arranged between the upper and lower reaches of the conveyor table, and in which the lower reaches of the chains in belt are in proximity and the engaging and contact members of the chains and table respectively are arranged to cooperate during their travel in such proximity, the table members being arranged to ride upon supporting members during their travel underneath the actuating chains.

6. A machine for conveying meat sides and the like past work stations for performing particular operations thereon, said machine comprising pairs of front and rear idler sprocket wheels, an endless conveyor table comprising cross slats and end links secured to said slats and pivoted together, certain of the cross slats being equipped with a pair of inwardly extending contact members spaced apart longitudinally of the table the distance between work stations, a second pair of front and a second pair of rear sprocket wheels arranged between the upper and lower reaches of the conveyor table, a pair of actuating sprocket chains arranged with one of the reaches of each chain adjacent the path of travel of one of the contact members of the conveyor table, and a pair of outwardly extending engaging members on opposite links of said sprocket chains arranged to successively engage said pair of contact members and shift said conveyor table the distance between such members.

BERNARD G. BRENNAN.